(12) United States Patent
Liang et al.

(10) Patent No.: US 9,014,419 B2
(45) Date of Patent: Apr. 21, 2015

(54) VALUABLE DOCUMENT IDENTIFICATION METHOD AND IDENTIFICATION SYSTEM THEREOF

(75) Inventors: Tiancai Liang, Guangzhou (CN); Zongbin Mu, Guangdong (CN); Dahai Xiao, Guangzhou (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 152 days.

(21) Appl. No.: 13/811,153

(22) PCT Filed: Jun. 30, 2011

(86) PCT No.: PCT/CN2011/076616
§ 371 (c)(1),
(2), (4) Date: Jan. 18, 2013

(87) PCT Pub. No.: WO2012/016485
PCT Pub. Date: Feb. 9, 2012

(65) Prior Publication Data
US 2013/0129140 A1    May 23, 2013

(30) Foreign Application Priority Data
Aug. 3, 2010 (CN) .......................... 2010 1 0251469

(51) Int. Cl.
*G06K 9/00* (2006.01)
*G07D 7/00* (2006.01)
(Continued)

(52) U.S. Cl.
CPC .............. *G06K 9/00442* (2013.01); *G07D 7/00* (2013.01); *G07D 7/2058* (2013.01); *G06K 9/32* (2013.01)

(58) Field of Classification Search
USPC ......... 382/100, 135, 136, 137, 138, 139, 140; 194/4; 209/534; 235/379; 250/200; 356/71; 902/7; 705/45
See application file for complete search history.

(56) References Cited

U.S. PATENT DOCUMENTS 3,930,582 A * 1/1976 Gartner et al. ................ 209/534
5,295,196 A * 3/1994 Raterman et al. ............ 382/135
(Continued)

FOREIGN PATENT DOCUMENTS

CN         1912933 A      2/2007
(Continued)

OTHER PUBLICATIONS

Extended European Search Report dated Apr. 10, 2014 from corresponding European Application No. EP11814068.
(Continued)

*Primary Examiner* — Anand Bhatnagar
(74) *Attorney, Agent, or Firm* — Wolf, Greenfield & Sacks, P.C.

(57) ABSTRACT

A valuable document identification method and an identification system thereof are provided. The method involves an information collecting module for identifying valuable documents starts, after a banknote separation module for storing valuable documents starts; information is sequentially collected by the information collecting module along movement direction of valuable documents; after arrival and pass of valuable documents are inspected, the collected valuable document identification information is processed and identified by the identification module, and an identification result is obtained; the valuable document information state is recorded; valuable documents are counted based on the identification result and the valuable document information state, and then valuable documents are identified and judged. As a result, the reliability of the valuable document identification process is improved, and the fault rate due to the counting problem is reduced.

10 Claims, 3 Drawing Sheets

(51) Int. Cl.
  *G07D 7/20* (2006.01)
  *G06K 9/32* (2006.01)

(56) References Cited

U.S. PATENT DOCUMENTS

| | | | |
|---|---|---|---|
| 6,466,340 B1 | 10/2002 | Washio | |
| 6,839,458 B2 * | 1/2005 | Mukai | 382/135 |
| 8,297,507 B2 * | 10/2012 | Kayani | 235/449 |
| 8,335,367 B2 * | 12/2012 | Nireki | 382/135 |
| 2009/0109502 A1 * | 4/2009 | Minamino | 358/488 |
| 2009/0324053 A1 * | 12/2009 | Ross et al. | 382/137 |
| 2010/0059591 A1 | 3/2010 | Kayani | |
| 2010/0303333 A1 * | 12/2010 | Nireki | 382/135 |

FOREIGN PATENT DOCUMENTS

| | | |
|---|---|---|
| CN | 200986718 Y | 12/2007 |
| CN | 101452588 A | 6/2009 |
| CN | 101529479 A | 9/2009 |
| CN | 101916470 A | 12/2010 |
| EP | 0451882 A2 | 10/1991 |
| JP | 8-16872 A | 1/1996 |

OTHER PUBLICATIONS

Australian Search Report dated Nov. 22, 2013 from corresponding Australian Application No. 2011288070.

* cited by examiner (a) background  (b) image of valuable document

VALUABLE DOCUMENT IDENTIFICATION METHOD AND IDENTIFICATION SYSTEM THEREOF

This application is a U.S. National Stage application of PCT International application number PCT/CN2011/076616, filed on Jun. 30, 2011 which claims the priority of Chinese Patent Application No. 201010251469.4 titled "Method for Identifying Paper Valuable Document and Paper Valuable Document Identifying System", filed with Chinese State Intellectual Property Office On Aug. 3, 2010, the entire disclosure of which applications are incorporated herein by reference.

FIELD OF THE INVENTION

The present invention relates to an identification technique, especially to a method for identifying valuable document and a valuable document identifying system.

BACKGROUND OF THE INVENTION

The valuable document identifying system based on the point triggering strategy in the prior art takes use of triggers to start data collection and valuable document identification. The principle of triggering is shown in FIG. 1. Photoelectric thru-beam sensors are arranged at the front end and rear end of the identifying device as position detector and are used as the triggering means for "START" and "END". The identifying system based on point triggering strategy is shown in FIG. 2. As for the present valuable document which is separated through separating operation, it is processed with the following procedures in the system:

(1) The present valuable document enters the transmission device (not shown), and the transmission device transmits the valuable document to the effective detecting region of the position detector (not shown);

(2) The presence of the valuable document is detected by the position detector when the photoelectric thru-beam sensor (not shown) is sheltered by the valuable document; the triggering signal of "the valuable document arriving" is sent to the central controller (not shown), the central controller gives "START" instruction to start the system and informs the front end counter to count up by one;

(3) The central controller gives an instruction to start the collecting device; the collecting device starts to collect the information of the valuable document and store the collected information of the valuable document in real-time; the collecting device stops collecting after the preset collecting time T which is in connection with physical size of the valuable document, and the collecting device gives "collection END signal" to inform the central controller;

(4) The central controller informs the identifying device, and the collected information of the valuable document is processed for identification;

(5) Identification is finished, and the present valuable document is transmitted to the rear position detector; when the photoelectric thru-beam sensor is sheltered by the valuable document, the signal of "the valuable document leaving" is sent to the central controller, and the central controller informs the rear end counter to count up by one;

(6) The central controller matches the counting result of the front end counter with that of the rear end counter. If the counting results are identical, it means that the process on the present valuable document is over, and the procedure for the next piece of the valuable document starts; otherwise, the system will report an error and stop operating.

The identifying system which adopts point triggering strategy has the following deficiencies:

(1) It is likely to occur a false triggering.

Based on point triggering strategy, the signal of whether the thru-beam sensor is sheltered or not is taken as the controlling input of the system. The information from several "points" is utilized to trigger the collecting, identifying and ending operation of the system. However, when processing some valuable documents having special shape, such as having transparent holes, if the detecting point of the thru-beam sensor is located on the positions of the transparent holes of the valuable document, the thru-beam sensor will fail in the range of the transparent holes of the valuable document. Therefore, it is likely to occur a false triggering and error rate of the system will be increased.

(2) The information is not collected completely, and the identification rate is low.

When processing some valuable documents having special shape, such as having transparent holes, if the detecting point of the thru-beam sensor is located on the positions of the transparent holes of the valuable document, the beam sensor will fail in the range of the transparent holes of the valuable document. In this case, the start of the collecting and identifying operation of the system will be delayed, and the end of the system will be ahead of the schedule to stop collecting, such that the information of the valuable document is not collected completely. Therefore, the identification of the system to the valuable document is affected and the identification rate of the system is reduced.

(3) Fixed collecting time lowers down the adaptability of the system for various valuable documents.

The collecting time T of the identifying system which adopts point triggering strategy depends on the physical size and moving status of the valuable document as well as the real-time electric transmitting status of the identifying device. In practical application, various valuable documents are of different physical sizes and are subjected to the problems like movement distortion. Therefore, it is difficult to set a collecting time T which is uniform, rational and adaptable for various valuable documents, which lowers down the applicability of the valuable document identifying system and impairs the prevailing application of the identifying system.

(4) Partially adhered valuable documents cannot be counted accurately.

In the case that the adhered valuable documents pass through the identifying device, two valuable documents are completely overlapped at the moment when they pass the front end position detector. After the adhered two valuable documents have moved for a period of time, and when they passed the collecting device and the identifying device and reached the rear end position detector, the two valuable documents become partially overlapped and are not separated completely, thus they are regarded as one valuable document by the rear end counter. Therefore, the adhered notes are counted by error.

SUMMARY OF THE INVENTION

In view of the problems existed in the valuable document identifying system which adopts point triggering strategy, the present invention provides a method for identifying the valuable document and a valuable document identifying system which are free of triggering.

The valuable document identifying system according to the present invention includes a central controller and a note-separating module, a transmitting module, a collecting module, a memory module, an identifying module and a counting module which are connected with the central controller through a bus, respectively, wherein:

the transmitting module is used to receive the valuable document separated by the note-separating module and transmit the valuable document to the collecting module;

the collecting module is used to collect an identification information of the valuable document;

the memory module is used to store the identification information of the valuable document collected by the collecting module;

the identifying module is used to read the collected identification information of the valuable document from the memory module, process and identify the identification information of the valuable document to obtain an identification result and send the identification result to the counting module;

the counting module is used to count the valuable document according to the identification result and information status of the valuable document, and realize the identification determination for the valuable document.

Preferably, the collecting module includes at least two stages of collecting units which are arranged one by one along the transmitting direction of the valuable document.

The present invention also provides a method for identifying the valuable document, which includes steps of:

starting an information collecting module for identifying the valuable document after a note-separating module storing the valuable document is started; collecting information row by row by the information collecting module along a moving direction of the valuable document; after having detected arrival and passage of the valuable document, processing and identifying the collected identification information of the valuable document by an identifying module to obtain an identification result and recording an information status of the valuable document; and counting the valuable document according to the identification result and the information status of the valuable document, and realizing an identification determination of the valuable document.

The method for identifying the valuable document specifically includes steps of:

Step 1: starting the note-separating module, and subsequently starting identification information collecting module for the valuable document;

Step 2: the information collecting module collects the information row by row along the moving direction of the valuable document; after having detected the arrival and passage of the valuable document, the identifying module processes and identifies the collected identification information of the valuable document, and records the information status of the valuable document; and Step 3: counting the valuable document according to identification result and the status of the valuable document, and realizing the identification determination of the valuable document.

Preferably, in step 2, the process of the identifying module processing and identifying the collected identification information of the valuable document to obtain the identification result and recording the information status of the valuable document includes that: the information collecting module has at least two stages of collecting processes, and after each stage of collecting process has detected the passage of complete valuable document, the identifying module processes and identifies the identification information of each complete valuable document to obtain the identification result of each stage and records the information status of each stage of the valuable document.

Furthermore, in step 3, the process of realizing the identification determination of the valuable document according to the identification result and the information status of the valuable document specifically includes that:

Step 31: corresponding data of the information status of each stage of the valuable document are matched with pre-stored standard data of the valuable document to determine whether they are identical, so as to obtain the matching result of each stage;

Step 32: the identification result of each stage and matching result of each stage are synthesized to achieve counting of the valuable document, and realize the identification determination of the valuable document.

When and only when each stage makes identification correctly and the status information of each stage are matched, the counting module counts up by one; otherwise, the counting module will give "error signal" to inform the central controller, and the central controller will process the error.

Preferably, in step 2, the process of detecting the arrival and passage of the valuable document specifically includes that:

Step 21: every time the information collecting module collects a row of information, to the identifying module matches the collected row of information with standard background image information to make a determination;

Step 22: when the collected information does not match with the background image information, it is determined that the valuable document arrives;

Step 23: when the collected information matches again, it is determined that the valuable document has passed, and then the identifying module processes and identifies the collected complete information of the valuable document and records the information status of the valuable document.

Preferably, the information status of the valuable document is the height value and width value of the valuable document.

The present invention provides the following advantageous effects:

1. It is unnecessary for the document identifying method and identifying system to have the thru-beam sensors as their triggering means, and to have the individual processing sections of front end counting and rear end counting. By collecting the multiple rows of information of the valuable document, the block region image in the valuable document is obtained, and the "face information" of the region of the valuable document is used to replace the "point information" of the thru-beam sensor, which is taken as the basis for describing the arrival of the valuable document. Therefore, the effective information amount of the status description of the valuable document is increased, the false triggering rate is reduced and the reliability of the system is improved.

2. Since the effective collecting length of the image collecting device could completely cover various bank notes, and the length of the image block $F_1$ and background image block S is the length of the bank note, as for the valuable document with transparent holes thereon, the detecting method which adopts the above steps could avoid the problem that the information is not collected completely, thus the identification rate of the system is improved.

3. When collecting the information, the collecting stopping condition is controlled by the similarity degree between the image block $F_1$ and background image S. Only if the similarity degree satisfies the preset collecting condition, the collecting is stopped; and it is unnecessary to preset the collecting time, so as to realize the self-adaption of the collecting time. Therefore, the identifying system is not limited by the physical status of the valuable document, such that the identifying system could automatically adapt to various valuable documents.

4. Since the technical solution of the present invention is to synthesize and match the status of the valuable document obtained by the front and rear two stages of image collecting devices, count and manage the amount of the valuable documents which are correctly identified by the system, the problem of counting and managing the partially adhered valuable documents is solved, the reliability of the system is improved and the failure rate caused by counting problem is reduced.

DETAILED DESCRIPTION

In order to aid those skilled in the art to better understand the technical solution of the embodiment of the present invention, hereinafter, the processing steps of the method for identifying the valuable document and the modular framework of the valuable document identifying system according to the present invention will be illustrated and described with reference to the drawings. The valuable document in the present embodiment may be, but is not limited to, paper valuable document, such as bank note, etc.

Figure 1:
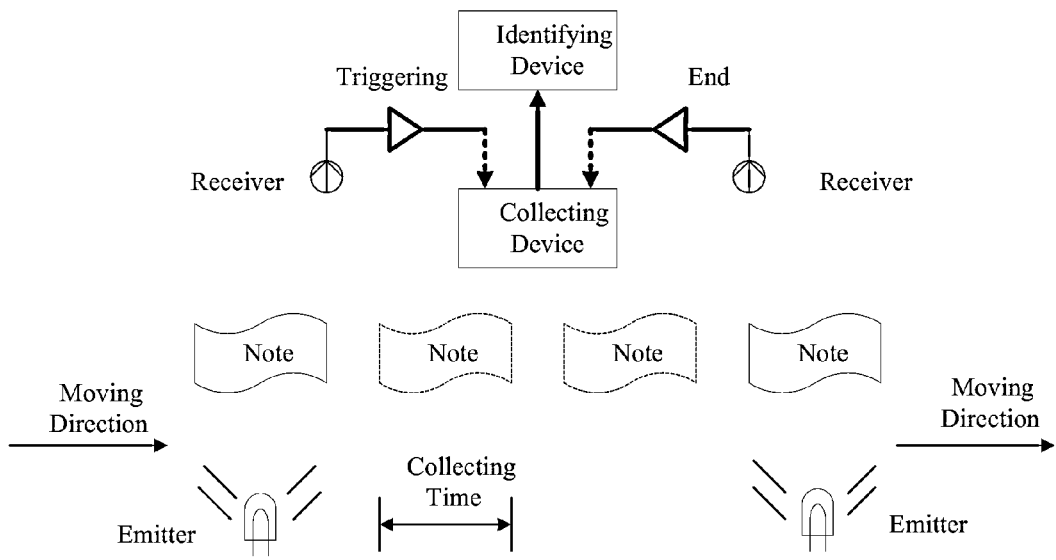
FIG. 1 is a schematic view of a valuable document identifying system based on point triggering strategy.
Figure 2:
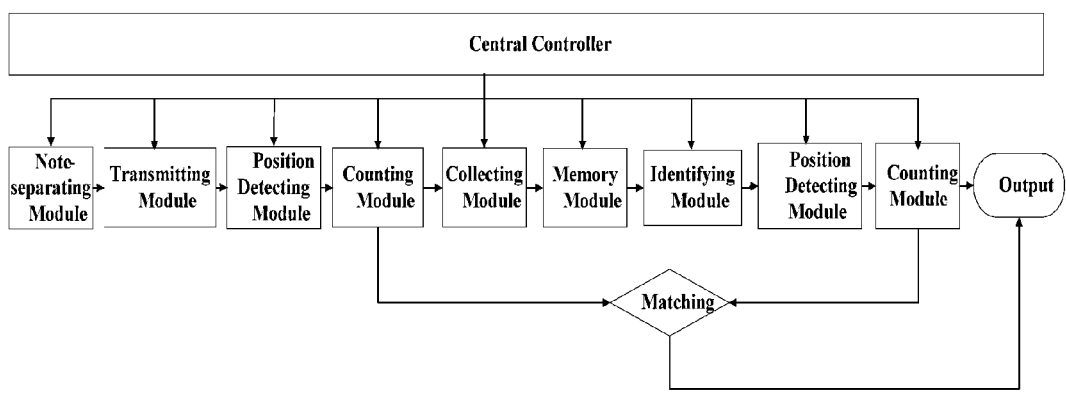
FIG. 2 is a structural view of a valuable document identifying system based on point triggering strategy.
Figure 3:
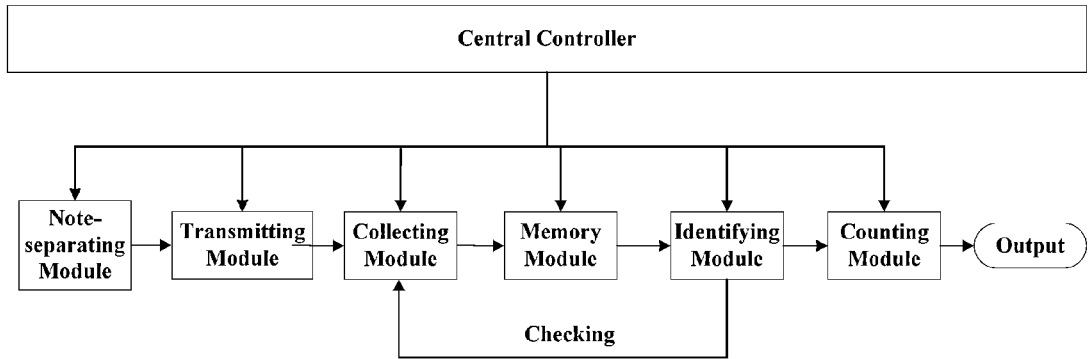
FIG. 3 is a modular framework diagram of a valuable document identifying system which is free of triggering according to the present invention.

The valuable document identifying system which is free of triggering shown in FIG. 3 includes a central controller and a note-separating module, a transmitting module, a collecting module, a memory module, an identifying module and a counting module which are connected with the central controller through a bus, respectively. The transmitting module is used to receive the notes separated by the note-separating module and transmit the valuable document to the collecting module; the collecting module is used to collect the identification information of the valuable document; the memory module is used to store the identification information of the valuable document which is collected by the collecting module, and the memory module could be a memory, etc.; the identifying module is used to read the collected identification information of the valuable document from the memory module, process and identify the identification information of the valuable document obtained by the collecting module, obtain identification result and send the identification result to the counting module; the counting module is used to count the valuable document according to the identification result and information status of the valuable document, as well as realize the identification determination for the valuable document.

The collecting module includes two stages of collecting units which are arranged one by one along the transmitting direction of the valuable document.

In the system, the implementing process of the function and the action for each module is described in the corresponding implementing process in the following method, and therefore its description is omitted.

Figure 4:
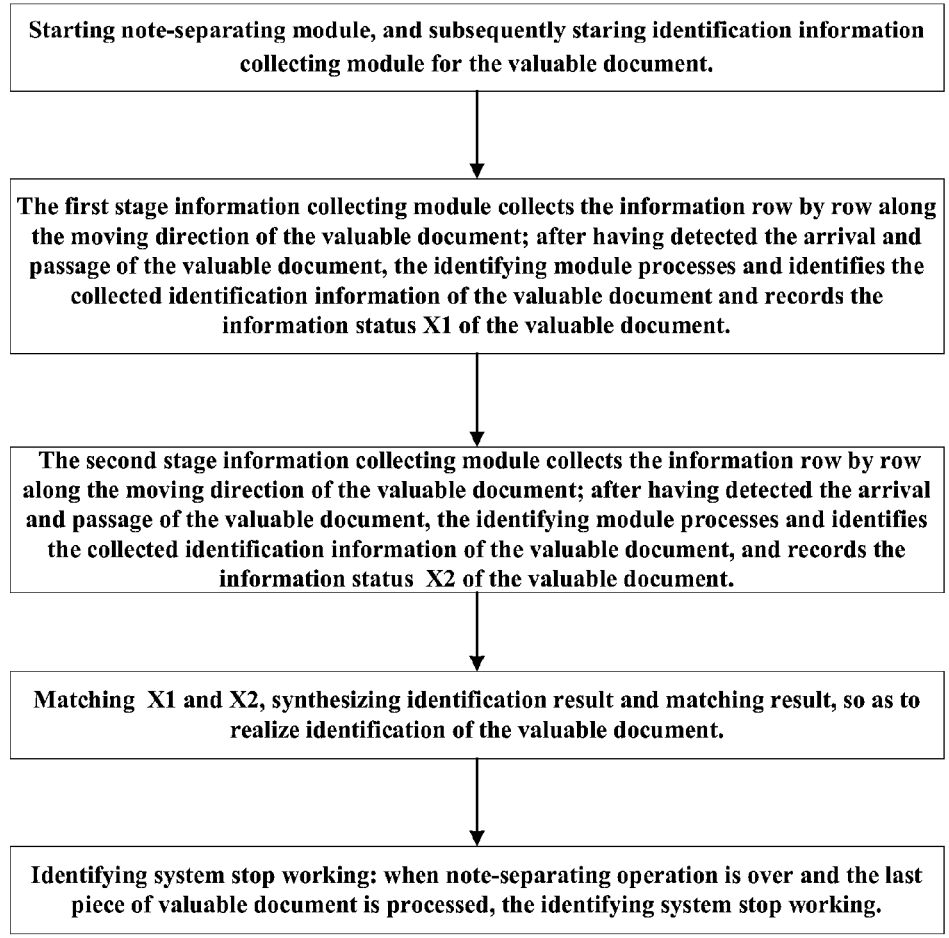
FIG. 4 is a flow chart of the method for identifying valuable document which is free of triggering according to the present invention.

The implementing method of the valuable document identifying system which is free of triggering will be described as follows. As shown in FIG. 4, the method for identifying the valuable document which is free of triggering includes: Step 1, starting the system: starting note-separating module, and subsequently starting the identification information collecting module for the valuable document; Step 2, the first stage collecting process, recording the status $X_1$ of the valuable document: wherein the information collecting module collects the information row by row along the moving direction of the valuable document; after having detected the arrival and passage of the valuable document, the identifying module processes and identifies the collected identification information of the valuable document and records the information status of the valuable document; Step 3, the second stage collecting process, recording the status $X_2$ of the valuable document: wherein the second stage information collecting module collects the information row by row along the moving direction of the valuable document; after having detected the arrival and passage of the valuable document, the identifying module processes and identifies the collected identification information of the valuable document, and records the information status $X_2$ of the valuable document; Step 4, synthesizing the matching result and the identification result, so as to finish the counting of the valuable document and realize identification of the valuable document: matching $X_1$ and $X_2$, synthesizing identification result and matching result, so as to realize identification of the valuable document; and Step 5, the identifying system stop working: when note separating operation is over and the last piece of valuable document is processed, the identifying system stops working.

Hereinafter, specific implementing process of each step will be described:

Step 1: Starting the System.

Since the valuable documents are placed on the note-separating module, note-separating module is started first, and the information collecting module for identifying the valuable document is started subsequently. The information collecting module includes two stages of collecting units which are arranged one by one along the transmitting direction of the valuable document.

Step 2: The First Stage Collecting Process, Recording the Status $X_1$ of the Valuable Document.

Assuming that it is necessary to collect N rows of information to obtain an image of the valuable document, then in this step, h rows of the information is collected, wherein h<N, and image block $F_1$ of the valuable document is formed from h rows of the information.

Before the valuable document arrives, the information collected by the collecting module is background image S, as shown in FIG. 5(a). Since the image of the valuable document as shown in FIG. 5(b) is substantially different from that of the background, the arrival of the valuable document could be detected through comparatively analyzing image block $F_1$ of the valuable document and background image block S.

1. Collecting and Identifying the Information of the Valuable Document.

(1) The information of the valuable document is collected. Every time h rows of information is collected, the similarity degree between image block $F_1$ and background image block S is calculated and is processed according to the following rules:

$$\text{if } D = \|F_1 - S\| \begin{cases} \leq d & \text{flag} = 1 \\ > d & \text{flag} = 0 \end{cases}$$

(2) If status flag is flag==1, the process jumps to step (1) and continues to collect the information;

(3) If status flag is flag==0, the process ends the collecting and enters identifying stage.

(4) Standard data of the valuable document including authenticity, denomination, orientation and new or old feature are stored in identifying module in advance. After the information of the valuable document has been collected, according to the preset identifying rules, the information of the present valuable document is compared with the pre-stored standard data of the valuable document, so as to output the result:

$$\text{Result\_1} = \begin{cases} 1 & \text{identifiable} \\ 0 & \text{others} \end{cases}$$

2. Recording the Status $X_1$ of the Image of the Valuable Document.

Definition: the status $X_1$ of the valuable document relates to the relationship between the height height_1 and the width width_1 of the image of the valuable document, i.e. $X_1=\{height\_1, width\_1\}$.

Step 3: The Second Stage Collecting Process, Recording the Status $X_2$ of the Valuable Document.

Assuming that it is necessary to collect N rows of the information to obtain an image of valuable document, then in this step, h rows of the information is collected, wherein h<N, and image block $F_2$ of the valuable document is formed from h rows of the information.

Figure 5:
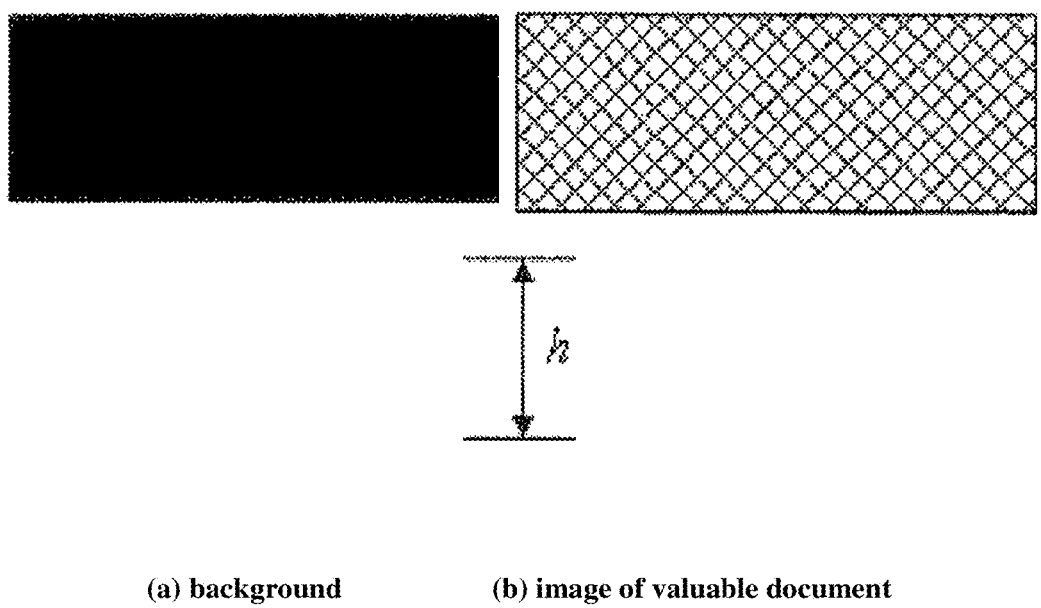
FIG. 5 is a view of the image of the information collected by the collecting module according to the present invention.

Since the image of the valuable document is substantially different from that of the background, as shown in FIG. 5, the arrival of the valuable document could be detected through comparatively analyzing collected image block $F_2$ and background image block S.

Every time the image block $F_2$ is collected, the similarity degree D between the image block $F_2$ and background image block S is calculated in real-time. If the similarity degree D between them satisfies the equation $D=\|F_2-S\|\leq d$, wherein $d\in[0.1,0.4]$, it means that the valuable document arrived, and the status flag is set as flag=1; otherwise, data collecting continues.

1. Collecting and Identifying the Information of the Valuable Document.

(1) After the information of the valuable document has been collected, every time h rows of information is collected, the similarity degree between image block $F_2$ and background image block S is calculate and processed according to the following rules:

$$\text{if } D = \|F_2 - S\| \begin{cases} \leq d & \text{flag} = 1 \\ > d & \text{flag} = 0 \end{cases}$$

(2) If status flag is flag==1, the process jumps to step (1) and continues to collect the information of the valuable document;

(3) If status flag is flag==0, the process ends the collecting and enters identifying stage.

(4) Standard data of the valuable document including authenticity, denomination, orientation and new or old feature are stored in identifying module in advance. After the information of the valuable document has been collected, according to the preset identifying rules, the information of the present valuable document is compared with the pre-stored standard data of the valuable document, so as to output the result:

$$\text{Result\_2} = \begin{cases} 1 & \text{identifiable} \\ 0 & \text{others} \end{cases}$$

2. Recording the Status $X_2$ of the Valuable Document.

Definition: the status $X_2$ of the valuable document refers to the relationship between the height height_2 and the width width_2 of the image of the valuable document, i.e. $X_2=\{height\_2, width\_2\}$;

In order to avoid the problem that the information is not collected completely, it is necessary to ensure that the effective collecting length of the two stages of the image collecting devices could cover various bank notes completely, thus the length of image block $F_1$ and background image block S are equal to or greater than the length of the bank note along the arranging direction of the collecting device.

Step 4: Synthesizing the Matching Result and the Identification Result, Realizing the Identification of the Valuable Document.

Parameter count is designated to represent the amount counter of the valuable document. Incorporating the identification results Re sult_1 and Re sult_2 obtained from the above steps as well as the status $X_1$ and $X_2$ of the valuable document obtained by two stages of image collecting devices, the calculating equation for synthesizing decision is described as follows:

$$\text{count} = \begin{cases} \text{count} + 1 & \{(\text{Result\_1} = 1) \& (\text{Result\_2} = 1)\} \cup \{X == X_2\} \\ \text{count} & \text{others} \end{cases}$$

According to the above equation, when and only when the first stage makes identification correctly, the second stage make identification correctly and the status information $X_1$ of the first stage and the status information $X_2$ of the second stage are identical, the counting module counts up by one; otherwise, the counting module will provide an "error signal" to inform the central controller, and the central controller will process the error.

As for the adhered notes, it is obvious that the status information $X_1$ of the first stage and the status information $X_2$ of the second stage are inconsistent, such that the counting module will provide the "error signal", and the central controller will process accordingly.

Step 5: Ending the Work of the Identifying System.

When the note-separating operation is over and the last piece of the valuable document is processed, the work of the system is ended.

It is unnecessary for the method for identifying the valuable document and the valuable document identifying system according to the present invention to have the thru-beam sensors as the triggering means and to have the individual processing sections of the front end counting and rear end counting. By collecting the multiple rows of information of the valuable document, the block region image in the valuable document is obtained, and the "face information" of the region of the valuable document is used to replace the "point information" of the thru-beam sensor, which is taken as the basis for describing the arrival of the valuable document. Therefore, the effective information amount of the status description of the valuable document is increased, the false triggering rate is reduced and the reliability of the system is improved.

Furthermore, since the effective collecting length of the image collecting device could completely cover various bank notes, the length of the image block $F_1$ and the background image block S is the length of the bank note. Therefore, as for the valuable document with transparent holes, the detecting method according to the present invention could avoid the problem that the information is not collected completely and improve the identifying rate of the system. And, when collecting the information, the collection stopping condition is controlled by the similarity degree between the image block $F_1$ and the background image S. Only if the similarity degree satisfies the preset collecting condition, the collecting is stopped; and it is unnecessary to preset the collecting time, so as to realize the self-adaption of the collecting time. Therefore, the identifying system is not limited by the physical status of the valuable document, such that the identifying system could automatically adapt to various valuable documents. Furthermore, the technical solution of the present invention is to synthesize and match the status of the valuable document obtained by the front and rear two stages of image collecting devices, count and manage the amount of the valuable documents which are correctly identified by the system, thereby solving the problem of counting and managing the partially adhered valuable documents, improving the reliability of the system and reducing the failure rate caused by counting problem.

It is noted that in the present text, the relationship terms like first or second and so on are only used to distinguish one object or operation from another object or operation, rather than requiring or implying that there are any practical relationship or sequence between these objects or operations. Further, terms like "comprise", "include" or any other variants are intended to cover "non-exclusive comprising", such that the process, method, item or device comprising a series of elements may comprise not only these elements, but also the other elements which are not listed specifically, or may further comprise the inherent elements of such process, method, item or device. In the condition without any more limits, the element which is limited by the sentence of "comprises a . . . " does not exclude that there are other identical elements in the process, method, item or device comprising the element.

Through the above description of the embodiment, those skilled in the art could clearly understand that the present invention could be implemented by means of software and necessary common hardware platform, or by means of hardware, although the former one is preferred embodiment under many circumstances. Based on such understanding, the technical solution of the present invention or the contributive part of the present invention over the prior art may be embodied in the form of software product, which could be stored in a storage media like ROM/RAM, disk, CD, .etc. and includes several instructions so as to instruct a computer device (which could be a personal computer, a server or a network equipment, etc.) to carry out the method described in each embodiment or some part of the embodiment of the present invention.

While preferred embodiments have been described above, it should be noted that for those skilled in the art, various changes and modification may be made thereto without to departing from the principle of the invention, which also fall into the scope of the present invention.

The invention claimed is:
1. A method for identifying a valuable document, wherein the method comprises steps of:
  starting an information collecting module for identifying the valuable document after a note-separating module storing the valuable document is started;
  collecting information row by row by the information collecting module along a moving direction of the valuable document; after having detected arrival and passage of the valuable document, processing and identifying the collected identification information of the valuable document by an identifying module to obtain an identification result and recording an information status of the valuable document; and
  counting the valuable document according to the identification result and the information status of the valuable document, and realizing an identification determination of the valuable document.

2. The method for identifying the valuable document according to claim 1, wherein the process of processing and identifying the collected identification information of the valuable document by an identifying module to obtain an identification result and recording an information status of the valuable document comprises that:
  the information collecting module has at least two stages of collecting processes, and after each stage of collecting process has detected passage of complete valuable document, the identifying module processes and identify the identification information of each complete valuable document to obtain an identification result of each stage, and an information status of each stage of the valuable document is recorded.

3. The method for identifying the valuable document according to claim 2, wherein the process of realizing the identification determination of the valuable document according to the identification result and the information status of the valuable document specifically comprises that:
  corresponding data of the information status of each stage of the valuable document are matched with pre-stored standard data of the valuable document to determine whether they are identical, so as to obtain a matching result of each stage;
  the identification result of each stage and the matching result of each stage are synthesized to achieve counting of the valuable document, and realize the identification determination of the valuable document.

4. The method for identifying the valuable document according to claim 3, wherein the information status of the valuable document is a height value and a width value of the valuable document.

5. The method for identifying the valuable document according to claim 2, wherein the information status of the valuable document is a height value and a width value of the valuable document.

6. The method for identifying the valuable document according to claim 1, wherein the process of detecting the arrival and passage of the valuable document specifically comprises that:
  every time the information collecting module collects a row of information, the identifying module matches the collected row of information with standard background image information to make a determination;
  when the collected information does not match with the background image information, it is determined that the valuable document arrives; and
  when the collected information matches with the background image information again, it is determined that the valuable document has passed, and then the identifying module processes and identifies the collected complete information of the valuable document and records the information status of the valuable document.

7. The method for identifying the valuable document according to claim 6, wherein the information status of the valuable document is a height value and a width value of the valuable document.

8. The method for identifying the valuable document according to claim 1, wherein the information status of the valuable document is a height value and a width value of the valuable document.

9. A valuable document identifying system, wherein the system comprises a central controller and a note-separating module, a transmitting module, a collecting module, a memory module, an identifying module and a counting module which are connected with the central controller through a bus, respectively, wherein:

the transmitting module is used to receive the valuable document separated by the note-separating module and transmit the valuable document to the collecting module;

the collecting module is used to collect an identification information of the valuable document;

the memory module is used to store the identification information of the valuable document collected by the collecting module;

the identifying module is used to read the collected identification information of the valuable document from the memory module, process and identify the identification information of the valuable document to obtain an identification result and send the identification result to the counting module;

the counting module is used to count the valuable document according to the identification result and information status of the valuable document, and realize the identification determination for the valuable document.

10. The valuable document identifying system according to claim 9, wherein the collecting module comprises at least two stages of collecting units which are arranged one by one along the transmitting direction of the valuable document.

* * * * *